United States Patent [19]
Furstenau et al.

[11] Patent Number: 5,739,526
[45] Date of Patent: Apr. 14, 1998

[54] FIBRE-OPTIC PHOTOELECTRIC BEAM DEVICE HAVING A TRANSMITTING OPTICAL UNIT FOR DETECTING A MOVING OBJECT THROUGH A CONTROL DISTRICT

[75] Inventors: Norbert Furstenau, Braunschweig; Werner Jungbluth, Konigslutter, both of Germany

[73] Assignee: Deutsch Forschungsanstalt fur Luft-und Raumfahrt e.V., Bonn, Germany

[21] Appl. No.: 639,628

[22] Filed: Apr. 29, 1996

[30] Foreign Application Priority Data

May 2, 1995 [DE] Germany .............. 195 15 365.0

[51] Int. Cl.[6] ............................. H01J 5/16
[52] U.S. Cl. ............. 250/227.14; 250/221; 250/559.4
[58] Field of Search .................. 250/227.14, 227.19, 250/227.21, 222.1, 222.2, 227.12, 559.4, 559.32, 559.12, 227, 17, 221; 385/4, 34, 36, 41, 42

[56] References Cited

U.S. PATENT DOCUMENTS

| | | | |
|---|---|---|---|
| 4,442,350 | 4/1984 | Rashleigh | 250/227.17 |
| 4,766,323 | 8/1988 | Franklin et al. | 250/237 G |
| 4,962,988 | 10/1990 | Swann | 385/34 |
| 5,008,529 | 4/1991 | Nakamura | 250/222.1 |
| 5,233,185 | 8/1993 | Whitaker | 250/222.1 |
| 5,343,036 | 8/1994 | Bohnert | 250/227.19 |

FOREIGN PATENT DOCUMENTS

| | | |
|---|---|---|
| 0 079 268 B1 | 5/1983 | European Pat. Off. |
| 0 291 366 B1 | 11/1988 | European Pat. Off. |
| 0 606 677 A2 | 7/1994 | European Pat. Off. |
| 35 41 027 A1 | 5/1986 | Germany |
| 38 44 294 C2 | 7/1990 | Germany |
| 40 19 794 A1 | 1/1991 | Germany |
| 43 44 650 C1 | 1/1995 | Germany |
| 2 242 976 | 10/1991 | United Kingdom |
| WO 88/00336 A1 | 1/1988 | WIPO |

OTHER PUBLICATIONS

*Laser* vol. 6,—pp. 11–13—"Erweiterte Einsatz"—Author: Roland Hackenjos—Germany, Jan. 1994.

*Laser und Optoelektronik* No. 3,—pp. 283–287—"Die Optische Kernzentrierung" Wolfgang Janiec, Germany, Jan. 1987.

*Primary Examiner*—Que Le
*Attorney, Agent, or Firm*—Salter & Michaelson

[57] ABSTRACT

A photoelectric beam device comprises a light source, a monomode optical fibre, a transmitting optical unit, a reflector and a photodetector, where the transmitting optical unit comprises a collimation optical unit, e.g. in the form of a graded index lens or rod lens and a beam expansion optical unit e.g. in the form of a telescopic optical unit. A fibre-optic directional coupler, arranged between the light source and the monomode fibre, conducts to the photodetector the optical signal reflected back from the reflector to the transmitting optical unit and refocused into the fibre.

11 Claims, 6 Drawing Sheets

FIBRE-OPTIC PHOTOELECTRIC BEAM DEVICE HAVING A TRANSMITTING OPTICAL UNIT FOR DETECTING A MOVING OBJECT THROUGH A CONTROL DISTRICT

BACKGROUND OF THE INVENTION

The present invention relates to a photoelectric beam device and more particularly to a device having a light source, an optical fibre, a transmitting optical unit, a reflector and a photodetector.

Basically a photoelectric beam or light barrier device consists of a light source which illuminates a photodetector arranged at a specified distance from the light source so that it is possible to register an interruption of the light beam by a change in the electric voltage level which is produced following the photodetector and which is proportional to the light intensity. The light source can have the form, for example, of a light-emitting diode (LED) or a laser diode with suitable focusing- or collimation optical unit. The photodetector, for example a photodiode, can be arranged next to the light source when the light beam is reflected back by a reflector on the other side of the open optical path opposite the light source. These LED- or laser photoelectric beam devices for industrial use in the manufacturing sector are described, for example, in the German magazine "Laser", Vol. 6, 1994, page 11 to 13. It is disadvantageous that such photoelectric beam devices are sensitive, in terms of their electric components arranged at the measuring location, to electromagnetic fields and other disturbing influences.

By way of comparison, for example the company Erwin Sick GmbH, Optik-Elektronik, of Waldkirch, Germany, has disclosed fibre-optic photoelectric beam devices, such as the types Sensick WLL 5 ... WLL 260 and NTL 6 and LUT 1-5. These sensors are used in automated industrial processes for the detection of objects. The sensors detect, for example, medicines, drinks bottles, packings, printed circuit boards to be equipped with electric components etc. The optical fibres provided in the photoelectric beam devices permit the detection of very small objects even in constricted space conditions as well as use in the vicinity of aggressive liquids, high temperatures, strong vibrations or strong magnetic and high-frequency fields. Flexible multimode glass- and multimode plastic optical waveguides are used. It is disadvantageous that dispersion of the propagation times of different sub-beams in the light beam (propagation time dispersion) within the multimode fibre leads to considerable pulse dispersion. Although the location of a not too remote object can be accurately detected, precise time measurements are not possible. Measurement over a relatively long distance is entirely out of the question.

In German Patent Document 43 44 650 C1 it has already been proposed, for an optical probe, that light be supplied by means of a transmitting optical fibre which has the form of a monomode optical fibre and that the light be led away again via a receiving optical fibre in the form of a multimode optical fibre. The devices in question are photoelectric beam devices for particularly short paths, for the detection of rotor blades in a turbo-machine.

Monomode optical fibres are also described in the German magazine "Laser und Optoelektronik" No. 3, 1987, pages 283 to 287 as suitable for long-range data transmission, which however relates exclusively to transmission within the monomode optical fibre. Monomode optical fibres have problems with the input coupling of optical information simply by virtue of their small active cross-section. In German Patent Document 43 44 650 C1 this leads, amongst other things, to the fact that even in the case of relatively short paths between transmitting optical fibre and receiving optical fibre, they are totally unsuitable for the latter. Also for example in German Patent Document 40 19 794 A1 it is pointed out that light-receiving optical fibres must possess a larger diameter than light-transmitting optical fibres.

Therefore, in accordance with the previous state of the art, monomode optical fibres have appeared to be completely excluded from use in the case of relatively large, open optical paths. Such open optical paths arise for example in applications on open ground, such as in the case of traffic monitoring. In such applications it has previously been completely impossible to use optical waveguides, and relatively long-range traffic monitoring was also frequently not possible.

SUMMARY OF THE INVENTION

The present invention seeks to provide a photoelectric beam device having optical fibres such that on the one hand long optical fibre lengths can be employed and on the other hand very large open optical paths can be covered while still making available an optical power adequate for analysis. The present invention also seeks to permit the determination of the direction of passage, speed and length of the object interrupting the light beam.

According to the present invention, there is provided a photoelectric beam device with a light source, an optical fibre, a transmitting optical unit, a reflector and a photodetector, wherein the optical fibre is a monomode fibre and the transmitting optical unit comprises a collimation optical unit.

BRIEF DESCRIPTION OF THE DRAWINGS

Preferred embodiments of the present invention will now be described, by way of example only, with reference to the accompanying drawings, in which.

DESCRIPTION OF THE PREFERRED EMBODIMENT

Basically, the fibre-optic supply cable in the form of the monomode fibre permits a spatial separation, over a long distance range, of the sensitive electric components from the open optical path which forms the actual photoelectric beam device. The attenuation of the optical signal in a monomode glass fibre amounts for example to only 0.3 dB/km in the case of a wavelength of 1300 nm. In the transmitting optical unit a high level of optical power is therefore made available which, due to the approximately Gaussian light intensity distribution which develops in the cross-section in the monomode fibre, can easily be focused via a collimation optical unit and thus can cover large open optical paths.

Due to the fact that a fibre-optic directional coupler is provided between the light source and the monomode fibre, by which directional coupler the optical signal reflected back from the reflector to the transmitting optical unit and refocused into the fibre is conducted to the photodetector, it becomes possible for the light beam reflected back by the reflector to be conducted back into the same fibre and to be forwarded, for detection, to the photodetector only at the end of the fibre with the fibre-optic directional coupler. It is thus possible to arrange both the light source and the photodetector and analysis electronic unit remote from the open light measurement section. This permits use in an environment subject to strong electromagnetic disturbances without costly electromagnetic compatibility protection, for example for traffic applications on open land with the potential effects of lightning during storms. Furthermore, only one single optical fibre need be installed at the installation location of the photoelectric beam device according to the invention. Electric supply lines and signal lines are not required. The installation outlay is thus advantageously reduced.

If the transmitting optical unit comprises a collimation optical unit preferably designed as graded index lens or rod lens and a beam expansion optical unit preferably designed as telescopic optical unit, a high degree of parallelism of the transmitted light beam is achieved. Consequently large open optical paths can be covered and nevertheless, after refocusing into the supply fibre, an optical power of the reflected light beam adequate for analysis is still available. The telescope expands the parallel light beam to a diameter of a few centimeters.

By virtue of the fact that the light source is designed as a high-power infrared diode, preferably a superluminescent diode (SLD), the optical unit can be optimally adjusted to the wavelength range used. In particular in the case of the use of chromatic light of a specific wavelength, wavelength-dependent image defects are avoided. Such light sources generate light of a low coherence length, the spectral breadth of which is for example in the range between 16 and 60 nm, whereby a reduction is obtained in the disturbing low-frequency intensity fluctuations which occur in the use of laser diodes due to interference effects. The optical wavelength used is for example 830 nm, 1300 nm or 1500 nm.

With a triple mirror, a highly accurate back-reflection of the light beam striking the reflector is obtained. Small deviations of the mirror alignment from the beam direction are corrected by the prisms of the triple mirror. The incident light beam is precisely reflected back in itself.

For optimal coupling of the monomode fibre to the graded index lens or rod lens, both a guide tube surrounding the end of the monomode fibre (ferrule) and a further tube embracing the ferrule and the rod lens are provided.

The direction of movement, speed and size of a moving object can be determined by a defined light intensity difference in one light beam or between two adjacent light beams.

By virtue of the fact that the directional coupler is of asymmetrical construction, two separate collimation optical units being connected to its outputs in each case via a monomode fibre with the result that two separate light beams of unequal intensity are available, a movement analysis of the object to be measured in accordance with a first variant is facilitated.

Equally, a movement analysis is possible in that the light intensity is weakened to half the light beam, where preferably a neutral filter is provided for the intensity weakening.

Figure 1:
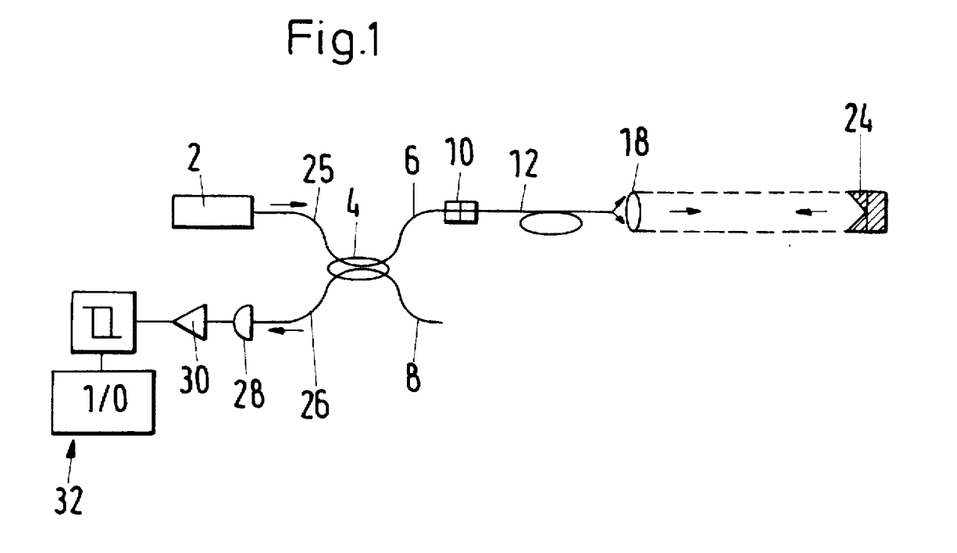
FIG. 1 schematically illustrates the construction of a photoelectric beam device according to a first embodiment of the invention.

Referring to the drawings. FIG. 1 schematically illustrates the construction of a fibre-optic photoelectric beam device according to the invention. As light source, the photoelectric beam device comprises a high power LED 2, preferably a SLD (superluminescent diode) operating in the infrared range with a wavelength of 1300 nm. Alternatively, it is also possible to use diodes with optical wavelengths with typical values of 830 nm or 1500 nm. The LED possesses a monomode glass fibre attachment, a so-called pigtail. This fibre pigtail of the diode is spliced to a first input arm 25 of a fibre-optic directional coupler 4. At least one of the two outputs 6, 8 of the fibre-optic directional coupler 4 is connected via a monomode plug connection 10 to a monomode fibre 12. This cabled monomode fibre 12 conducts the light to the actual photoelectric beam device measurement section. At its other end the monomode fibre 12 is connected to a collimation optical unit 18 via a monomode plug 14 and a corresponding adapter 16. On the other side of the open optical path of the photoelectric beam device a retroreflector 24 is arranged opposite the collimation optical unit 18. The reflector 24 reflects the light beam directed towards it back into the collimation optical unit 18 independently of the angle of incidence.

Figure 2:
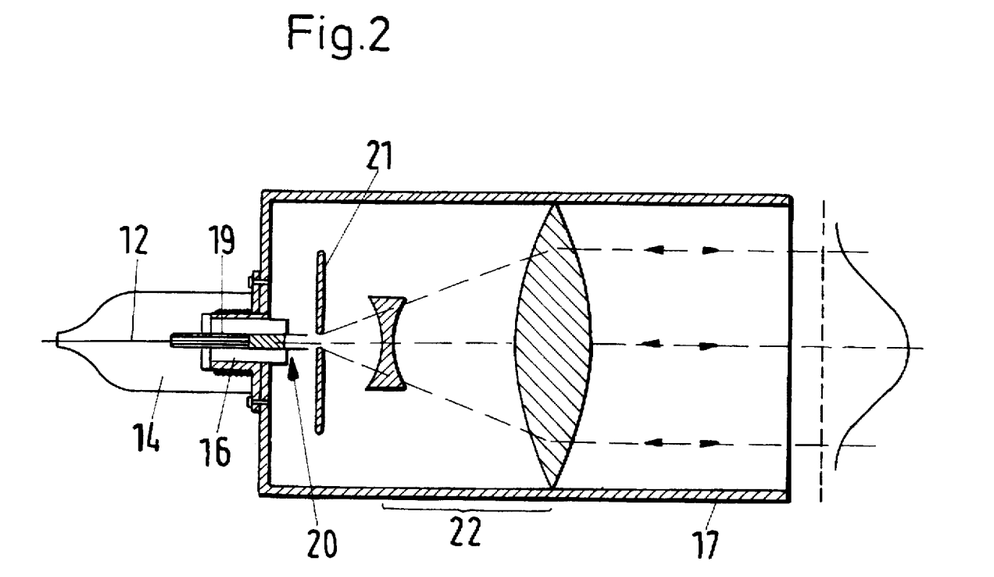
FIG. 2 illustrates the transmitting optical unit, designed as collimation- and expansion optical unit, of the photoelectric beam device of FIG. 1.

FIG. 2 illustrates the construction of the collimation optical unit 18. The monomode fibre 12, which serves for the signal transmission, terminates in the collimation optical unit 18 in the monomode fibre plug 14. The fibre end of the monomode fibre 12 is fitted and guided in a precision guide tube 19. The monomode fibre 12 is connected by the monomode plug 14 via a plug adapter 16 to the collimation optical unit 18 accommodated in a housing 17. The plug adapter 16 arranged in the housing 17 contains a central bore into which the guide tube (ferrule) 19 projects when the monomode fibre 12 is connected. Arranged in this bore, directly adjoining the fibre end face of the monomode fibre 12 disposed in the fibre guide tube 19, is a graded index lens (GRIN) or rod lens 20. The graded index lens 20 is a rod lens with a diameter of for example 2 mm which has been rendered antireflective for the optical wavelength used, for example 1300 nm. The graded index lens 20 is designed such that the light beam emerging in divergent fashion from the end face of the monomode fibre 12 with a numerical aperture NA of 0.1 is collimated into a parallel beam. When the plug 14 is screwed tight, the polished end face of the monomode fibre 12 guided in the precision fibre guide 19 contacts the antireflective end face of the rod lens 20.

The housing 17 of the collimation optical unit 18 also accommodates a telescopic optical unit 22 for the expansion of the optical beam. The telescopic optical unit 22 consists of a diverging lens system and a collecting lens system, where the collimated light beam with a diameter typically of 2 mm which emerges from the rod lens 20 is expanded to a parallel light beam of a few centimeters diameter. The light intensity profile of the light beam emitted from the collimation optical unit 18 has a Gaussian distribution over the beam cross-section.

As illustrated in FIG. 1, the thus expanded light beam is directed to a retroreflector, for example a triple mirror 24, on the other side of the area to be monitored. By virtue of its prisms, the triple mirror 24 provides for a precise back-reflection of the light beam directed towards it into the original direction. Here a slight maladjustment of the mirror 24 is compensated by its prism arrangement. Having passed through the telescopic optical unit 22, the light beam is again focused by the graded index lens 20 into the core of the monomode fibre 12. The reflected light thus passes via the monomode fibre 12 to the directional coupler 4. The fibre-optic directional coupler 4 splits off the reflected light beam and feeds it into a second input arm 26 of the directional coupler 4 to which a photodiode 28 is connected. A preamplifier 30 for the amplification of the signal level of the photodiode 28 is connected to the electric output of the photodiode 28. The output of the pre-amplifier 30 is connected to an analysis electronic unit 32. The analysis electronic unit 32 is provided where necessary with a threshold value circuit with digital input/output or an analogue/digital converter to allow digital processing of the measurement data.

An exemplary embodiment of the photoelectric beam device for movement detection in the form of a first variant will be described in the following.

Figure 3:
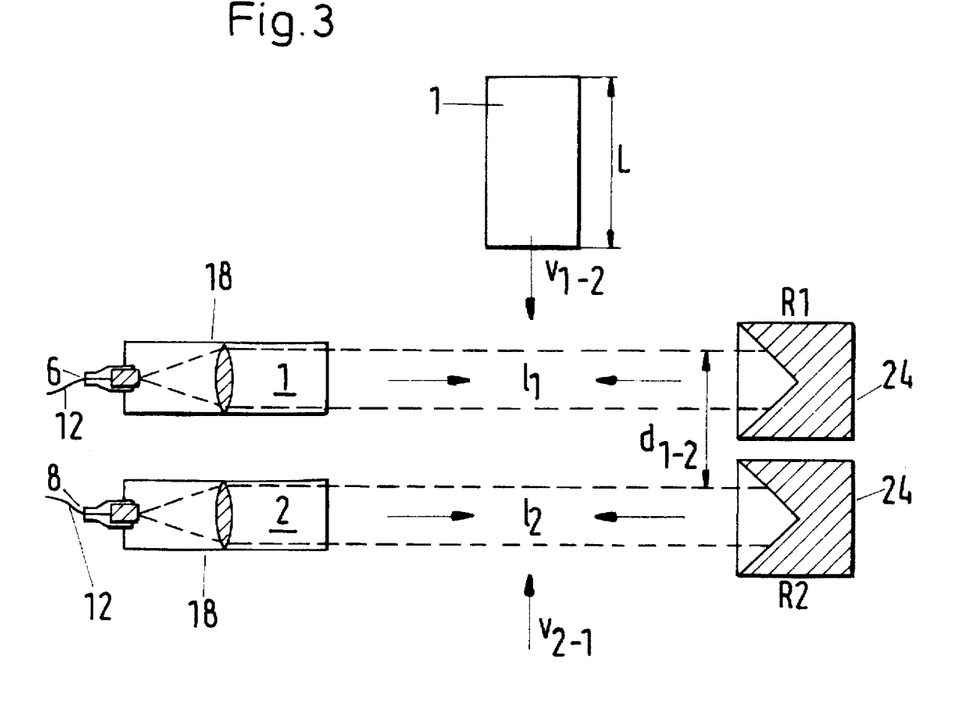
FIG. 3 illustrates a construction of a photoelectric beam device for determining the movement direction of an object to be measured in accordance with a second embodiment.

FIG. 3 illustrates the schematic construction of such a photoelectric beam device for detecting the direction of movement, speed and length of an object 1 to be detected. In this exemplary embodiment two light measurement sections arranged in parallel beside another are provided. The light measurement sections are supplied by a common light source (not shown). The light irradiated from the light source is distributed asymmetrically via a fibre-optic directional coupler between its outputs 6, 8. From the outputs 6, 8 of the asymmetrical directional coupler a monomode fibre 12 in each case leads to the collimation optical units 18 aligned in parallel one beside another. The two collimated and expanded light beams are aligned with two retroreflectors 24 on the other side of the area to be monitored. Due to the asymmetrical separation in the directional coupler, the two light beams possess different light intensities $l_m$ and $l_2$.

Figure 4:
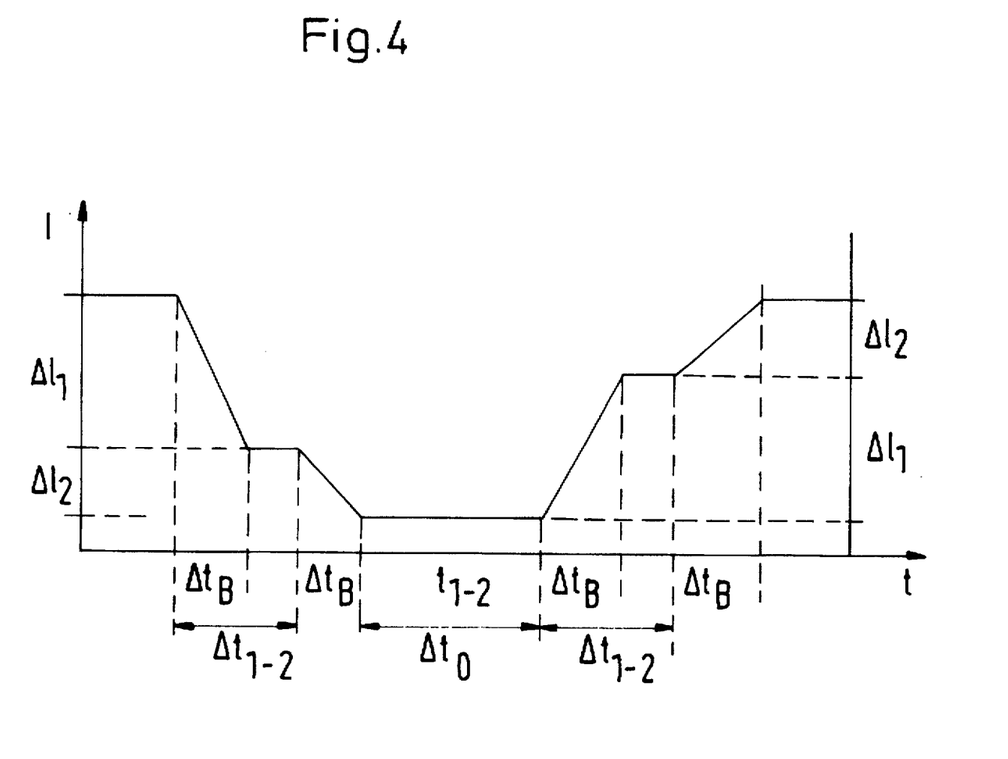
FIG. 4 is a schematic time diagram of the change in light intensity in the case of the photoelectric beam device of FIG. 3.

An object 1 to be detected, which moves through the area to be monitored with a speed $v_{1-2}$, firstly covers the first light beam with the light intensity $l_1$ and then the light beam with the light intensity $l_2$. Depending upon the speed $v_{1-2}$ and the length L of the object 1, a characteristic image is registered of the intensity change over time across the photodiode 28 connected to the second input arm 26 of the asymmetrical directional coupler 4 (FIG. 1). The time diagram of the intensity change is schematically illustrated in FIG. 4. The intensity registered across the photodiode 28 remains constant at a maximum level until the object 1 to be detected enters the beam path of the open optical path of the photoelectric beam device. The light intensity measured across the diode 28 reduces by $\Delta l_1$ in the time interval $\Delta t_B$ for the covering of the first light beam. When the object 1 moves further through the measurement section of the photoelectric beam device according to the invention, the light intensity level remains temporarily constant until the second light beam is reached. Then the light intensity measured across the photodiode 28 reduces again by a specified intensity amount, namely $\Delta l_2$, during a time interval $\Delta t_B$ for the covering of the second light beam. During the complete coverage of the two light beams over the time interval $\Delta t_0$, a constant intensity minimum is registered. When the rear edge of the object 1 now again leaves the beam path of the first light beam over the time interval $\Delta t_B$, the light intensity measured across the photodiode 28 increases by $\Delta l_1$. Following a short constant intermediate level, the rear edge of the object 1 then also leaves the beam path of the second light beam so that then the measured light intensity again increases by $\Delta l_2$ to the original maximum intensity level over a time interval $\Delta t_B$.

The direction of passage of the object 1 is detectable from the sequence of the intensity changes. The example illustrated in FIG. 4 firstly shows a large intensity change $\Delta l_1$ with following small intensity change $\Delta l_2$, which corresponds to the arrow direction $v_{1-2}$ in FIG. 3. By measuring the time between the start of the intensity changes in the case of the first and second light beam, referenced $\Delta t_{1-2}$ in FIG. 4, it is possible to determine the speed v of the throughgoing object 1:

$$v = d_{1-2}/\Delta t_{1-2}; \tag{1}$$

where $d_{1-2}$ is the distance between the two parallel light beams. Furthermore, from the interruption time of the two light beams, the time interval designated $\Delta t_0$ in FIG. 4, the length L of the object 1 is detectable under the condition that $L \gg d_{1-2}$:

$$L = v \times \Delta t_0. \tag{2}$$

Figure 5:
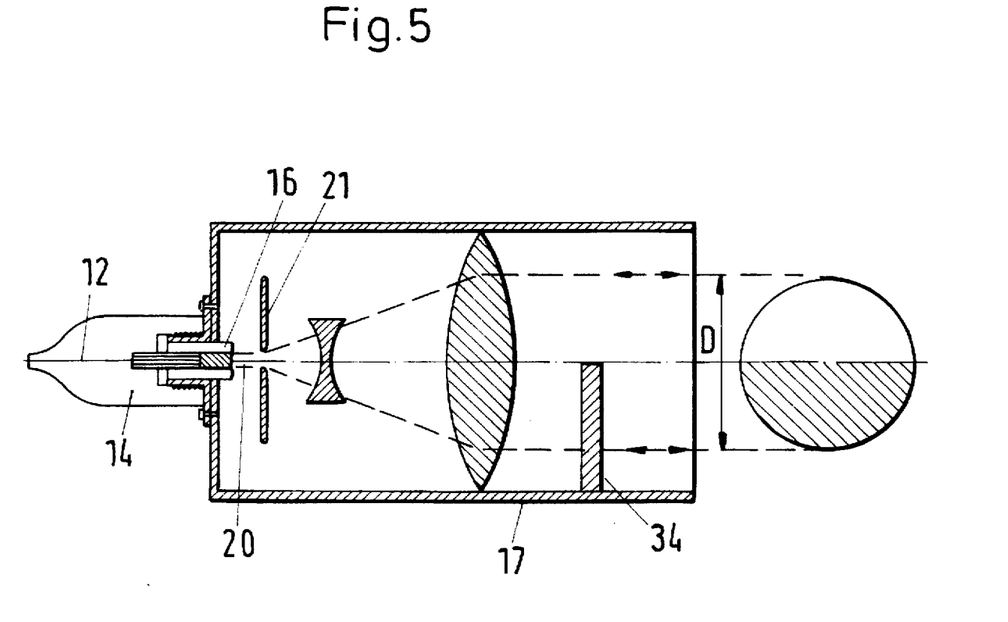
FIG. 5 illustrates the transmitting optical unit of a photoelectric beam device according to the invention for determining the movement of an object to be measured in accordance with a third embodiment.

Alternatively, movement detection can also be carried out using a photoelectric beam device according to the invention in accordance with the exemplary embodiment of a second variant described in the following. In this exemplary embodiment only one light beam corresponding to the construction shown in FIG. 1 is used. However, in order to obtain an asymmetrical light intensity distribution, in the collimation optical unit 18, preferably downstream of the telescopic optical unit 22 equipped with a diaphragm 21, a filter 34 is provided which attenuates exactly half of the preferably expanded light beam. The filter 34, which preferably is formed by a neutral filter, is arranged in such manner that the movement to be detected is aligned at right angles to the separating line between the attenuated light beam and the non-attenuated light beam. FIG. 5 illustrates the construction with the neutral filter 34 arranged semi-laterally in the housing 17 of the collimation optical unit 18. In FIG. 5 the movement direction to be detected extends at right angles to the dash-dotted optical axis of the collimation optical unit 18 and in the drawing plane of FIG. 5.

Figure 6:
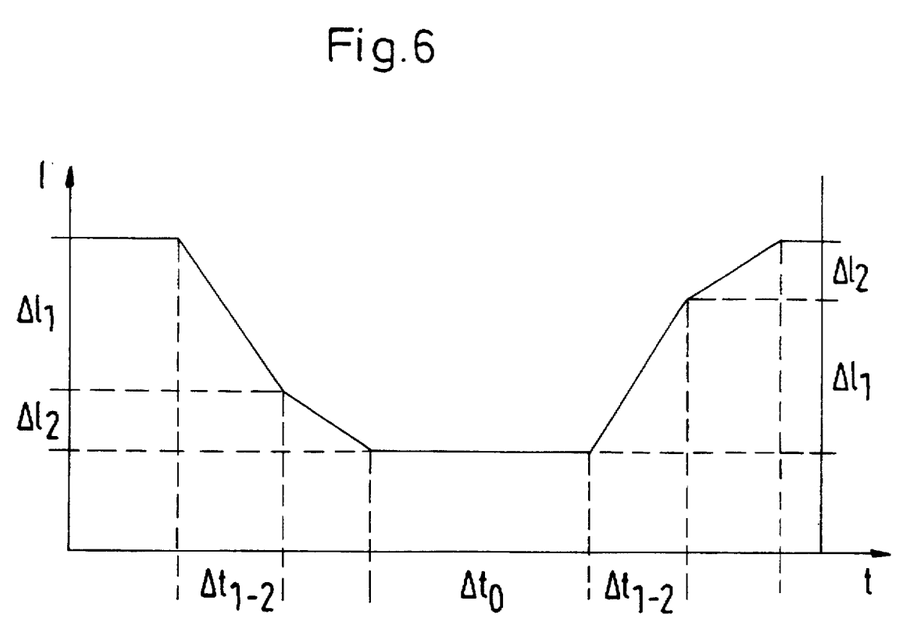
FIG. 6 is a schematic time diagram of the change in light intensity in the case of the photoelectric beam device of FIG. 5.

FIG. 6 is a schematic representation of a time diagram of the intensity change when an object 1 passes through the photoelectric beam device according to the invention. For such time as the light beam is reflected back unhindered, a constant maximum light intensity is registered across the photodiode 28. When an object 1 to be detected reaches the light beam, the light intensity measured across the photodiode is reduced by the intensity $\Delta l_1$ until the first half of the light beam is completely covered. Then the same period of time $\Delta t_{1-2}$ is required to cover the second half of the light beam and thus to further reduce by $\Delta l_2$ the light intensity registered across the photodiode 28. Then the object 1 to be measured passes through the light beam with complete coverage for a time interval $\Delta t_0$. When the rear edge of the object 1 reaches the outer edge of the light beam, then for a first time interval of $\Delta t_{1-2}$ the measured light intensity is increased by $\Delta l_1$ and then, when the weakened part of the light beam is moved away from, the intensity is increased again by $\Delta l_2$ to the constant maximum level in a second time interval $\Delta t_{1-2}$.

The direction of movement can again be read from the shape of the curve. In this example the sequence of the intensity changes indicates that the object to be measured firstly shades the non-weakened part of the light beam and then the weakened part of the light beam. The speed v of the throughgoing object is then determined as follows:

$$v = \tfrac{1}{2} D / \Delta t_{1-2}; \qquad (3)$$

where D=effective diameter of the light beam. The length of the detected object 1 can again be calculated in accordance with equation (2).

With the present invention it is possible to make available a photoelectric beam device wherein the electric components which are sensitive to electromagnetic fields, such as the light source 2, the photodetector 28 and the analysis electronic unit 30, 32, can be arranged remote from the optical components. The distance, bridged by the monomode fibre 12, from the electric components to the open optical path of the actual photoelectric beam device can amount to several kilometers. The attenuation which occurs in the case of the preferred wavelengths in the infrared range in the monomode glass fibre is extremely small. The collimation optical unit tuned to a specified wavelength produces an expanded, parallel beam in which scatter losses, in particular also due to air turbulence, are reduced. It is thus possible for the collimated light beam to bridge very large open optical paths and nevertheless to be able, after reflection, to be coupled back into the supply fibre with only small losses. The photoelectric beam device according to the invention is also particularly suitable for the detection of large objects, for applications in the traffic sector, such as for example for aircraft on runways and vehicles in road traffic. The reflected light beam exhibits adequate optical power to bridge open optical paths of several tens of meters.

As a result of the provision of an asymmetrical light intensity distribution, the photoelectric beam device according to the invention can serve not only to determine the location of the object interrupting the light beam but also to determine the direction of movement, speed and length of the object to be monitored. The fields of application of the photoelectric beam device according to the invention thus far exceed the possible uses of conventional photoelectric beam devices for the industrial sector.

It will be understood that the above description of the present invention is susceptible to various modifications, changes and adaptations.

List of References

1 Object
2 LED
4 Directional coupler
6 Output
8 Output
10 Monomode plug
12 Monomode fibre
14 Monomode plug
16 Adapter
17 Housing
18 Collimation optical unit
20 Precision guide tube
22 Rod lens (graded index lens)
21 Diaphragm
22 Telescopic optical unit
24 Retroreflector
25 First input arm
26 Second input arm
28 Photodiode
30 Pre-amplifier
32 Analysis electronic unit
+Neutral filter.

What is claimed is:

1. A photoelectric beam device for detecting a moving object through a control district having first and second ends, said device comprising:
   a light source for generating a beam of rays;
   a monomode fiber connected at one end thereof to the light source;
   a transmitting optical unit having a collimation optical unit connected to said monomode fiber at an opposite end of the monomode fiber, a beam expansion optical unit located at the first end of the control district, and a retro reflector located at the second end of the control district; and
   a photo detector at the first end of the control district for tracing a part of the beam of rays reflected from the retro reflector via the transmitting optical unit and the monomode fiber.

2. A photoelectric beam device as set forth in claim 1, said collimation optical unit having one of a graded index lens and a rod lens.

3. A photoelectric beam device as set forth in claim 2 further comprising a guide tube surrounding the opposite end of the monomode fiber for coupling the monomode fiber to one of the graded index lens and rod lens.

4. A photoelectric beam device as set forth in claim 3, said beam expansion optical unit comprising a telescopic optical unit.

5. A photoelectric beam device as set forth in claim 1 further comprising a fiber-optic directional coupler for conducting to the photo detector an optical signals reflected back from the retro reflector to said transmitting optical unit and refocused to said monomode fiber.

6. A photoelectric beam device as set forth in claim 1, said light source comprising a heavy-duty infra-red diode.

7. A photoelectric beam device as set forth in claim 1, said light source comprising a super luminescence diode.

8. A photoelectric beam device as set forth in claim 1, said retro reflector embodying a triple mirror.

9. A photoelectric beam device as set forth in claim 1 further comprising a second transmitting optical unit having a second collimation optical unit connected to another monomode fiber, a second beam expansion optical unit located at the first end of the control district, and a second retro reflector located at the second end of the control district, wherein the direction of movement and speed of the moving object through the control district and the linear length (L) of the moving object is determined by light intensity differences $(l_1, l_2)$.

10. A photoelectric beam device as set forth in claim 9 further comprising a directional coupler having a pair of outlets, said two collimation optical units being connected to the outputs of the directional coupler by said monomode fibers, each fiber carrying two separate light beams of unequal intensity $(l_1, l_2)$.

11. A photoelectric beam device as set forth in claim 10 further comprising a neutral filter disposed within the transmitting optical unit for attenuating the light intensity.

* * * * *